(No Model.)
W. C. FAHY.
OIL PURIFIER.
No. 591,394.  Patented Oct. 12, 1897.
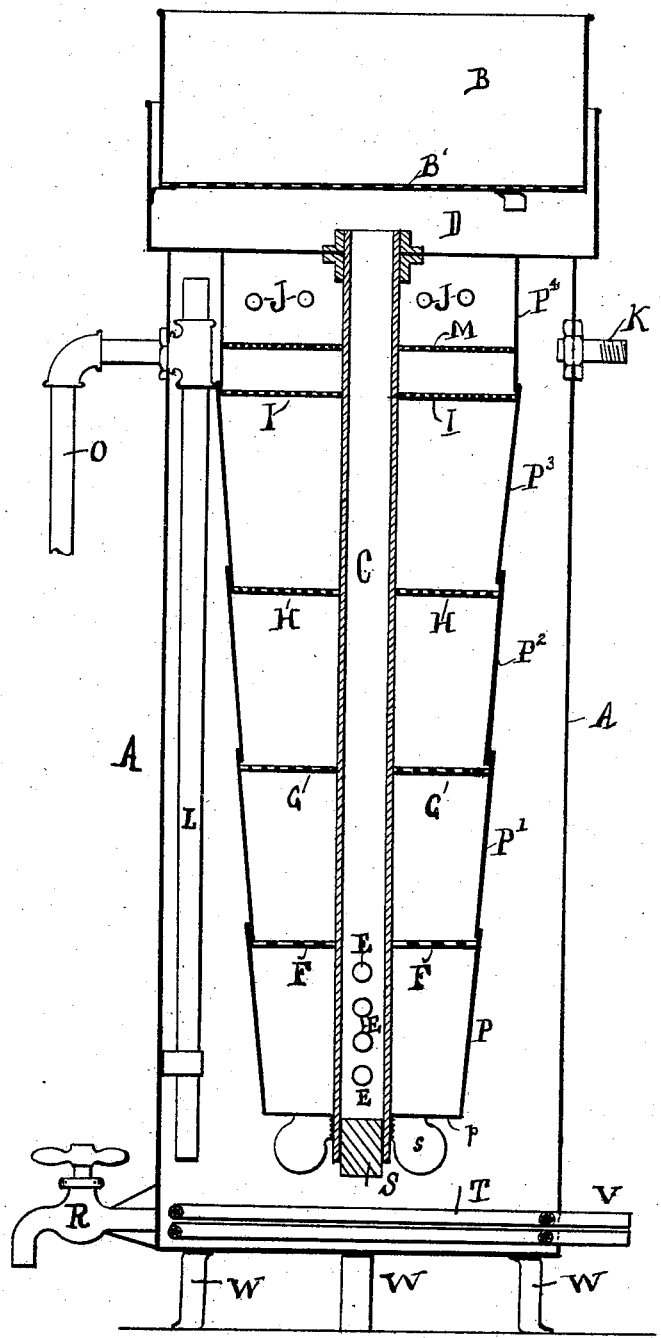

UNITED STATES PATENT OFFICE.

WILLIAM C. FAHY, OF PHILADELPHIA, PENNSYLVANIA.

OIL-PURIFIER.

SPECIFICATION forming part of Letters Patent No. 591,394, dated October 12, 1897.

Application filed April 21, 1896. Serial No. 588,527. (No model.)

*To all whom it may concern:*

Be it known that I, WILLIAM C. FAHY, a citizen of the United States, residing in the city and county of Philadelphia, State of Pennsylvania, have invented a new and useful Improvement in Oil-Purifiers, of which the following is a specification, reference being had to the drawing annexed.

Among the chief objects of my invention is, first, to filter the mixture of oil, water, and impurities which has dripped from machinery or come from other sources and separating the oil from the water in continuous operation, whereby the impure oil can be introduced into the purifier and the purified oil and water separated and decanted separately from each other automatically and continuously, and, secondly, to construct a machine in which the deposit of the solid impurities as they are removed from the liquid will not hinder to a practical extent the free passage of the latter.

My invention to fulfil these objects is directed to an apparatus in which the mixture of oil and water passes through a series of perforated diaphragms or other filtering media that progressively remove more and more of the solid material, after which the purified oil and water are separated by reason of their different specific gravities and automatically separated by outlet-pipes. The settling out of a portion of the solid matter is also accomplished before beginning the filtering proper in the best form of my invented device.

Describing now in detail the best form of apparatus of which I am now aware for carrying out my invention, the figure is a vertical section of my invented device.

Describing first the filtering and settling devices, the settling devices consist of a solid-bottomed pan D, which has projected through it the mouth of a pipe C, which is raised slightly above the bottom of the pan D. The pipe C is suitably secured to this bottom. This pipe carries the mixed oil and water downward toward the bottom of the device and is perforated near the bottom with a series of holes E E E E, which open into the lowermost casing P of a series of casings P P' P² P³, placed one above the other, and the lower end of each of the casings, except the bottom one, fitting into the top of the one below and making a tight joint therewith. The lower one of these casings is provided with the solid bottom piece $p$, and the top casing P⁴ fits against the bottom of pan D. These pans are provided with the perforated media F G H I M, the perforations in each being larger than in the one above and smaller than the one below unless for some special reason a departure in this particular is desired. These casings are nested around the pipe C and are held in place by the nut $s$ or other suitable fastenings. The bottom of the pipe is closed by a plug S or some other suitable contrivance.

The water and oil flow out from the casing P⁴ by the holes J J into the tank A. This is provided with two outlets, the one formed by pipe K, by which the oil passes off, and the other by pipes L and O, by means of which the water flows out. The highest outlet of pipe K is higher than the highest outlet of pipe O, the difference in level being, however, less than the difference in height between a column of oil and a column of water of equivalent cross-section and equal weight. The pipe L dips downward toward the bottom of the tank A, and has an opening at the top above the level of the liquid and opens into pipe O, through which the water passes off to a sewer or other waste place. The oil-pipe K can be connected with any suitable oil-receptacle. Suitably supported on pan D is pan B, with the perforated bottom B'. It is arranged to be readily removable. In this tank A is placed the heating-coil T, which can be supplied from pipe V. The liquid in the tank A can be drawn off by faucet R. In practice I support the structure on legs W.

The operation of the device is as follows: The mixture of oil, impurities, and water is cast into the pan B and strained through the strainer B' and passes into pan D. Here much of the finer heavier impurities are deposited, and the mixture passes down through pipe C to casing P. Thence the mixture flows upward through the perforated media F, G, H, I, and M, the oil being more and more comminuted at each diaphragm, and therefore more readily and thoroughly washed by the water, and all the various mechanical contaminations thoroughly strained out. As these generally fall away from the diaphragm and leave it free for the passage of the liquid, the latter has a practically free passage. The oil and water mixed then flow into the tank A through the holes J. Here the two separate, the oil gathering at the top and the water at the bottom, the position of the line of separation between them being determined by the relative height of the outlet-pipes O and K, as explained above. The air-inlet into pipe L prevents the siphoning out of the liquid through any drop that may be given to pipe O. It may here be mentioned that when I start the device in operation the tank A and casing should be partly filled with water.

The device can be taken apart and cleaned by simply unscrewing nut s and the pans removed one by one. The tank can have the water let out and be washed out with a hose, if desired.

Having now described my invention, what I claim, and desire to secure by Letters Patent, is—

1. In an oil-purifier, a series of filtering media those adapted to remove the finer impurities being percolated last by the oil, a separating-tank receiving the oil and water from said filtering media, an oil-withdrawing pipe in communication with the said tank, and a water-withdrawing pipe in communication with said tank, and opening into the same at a considerably lower level than the oil-withdrawing pipe, and rising to a level considerably above that to which it dips, but below the level of the oil-withdrawing pipe and being arranged so as to prevent siphon action therethrough, substantially as described.

2. In an oil-purifier a series of filtering media and a settling-tank in communication with said filtering media, an oil-withdrawing pipe in communication with said settling-tank, a water-withdrawing pipe in communication with said settling-tank, and opening into said settling-tank at a much lower level than said oil-withdrawing pipe, and rising to a level nearly as high as said oil-withdrawing pipe, a pipe communicating with the air in communication with the higher part of said water-withdrawing pipe substantially as described.

3. In an oil-purifier, the combination of filtering means, a filtering-chamber for containing said means a settling-tank a water-withdrawing pipe having an inlet toward the bottom of said tank and rising to a level above said inlet, and provided with an outlet to the outer air extending upward from said pipe to a point above the level of the liquid in the tank and an oil-outlet pipe rising to a higher level than the top of the water-outlet pipe substantially as described.

4. The combination of the tank, the pan above said tank, the removable pan having a perforated bottom adapted to be placed in said first-named pan, a pipe opening into said first-named pan and extending downward into said tank, and having apertures at the bottom, a series of pans each provided with a perforated diaphragm, resting in each other the uppermost of said pans having openings into said tank, an oil-withdrawing pipe, a water-withdrawing pipe and a heating-coil all substantially as described.

5. The combination in an oil-filter of a pan of a pipe penetrating the bottom of said pan and extending slightly above it and secured thereto, a series of pans each containing a perforated diaphragm surrounding said pan, and fitting snugly to each other, and means movably secured to the bottom of said pipe, for clamping the pans together between said means and said pan at the top of said pipe substantially as described.

6. The combination of a pan, a pipe leading downward from said pan and having apertures at the bottom of same, a series of casings surrounding said pipe, diaphragms secured to said casings, said diaphragms at the top having finer perforations than those at the bottom, and the top casing fitting tightly into the bottom of the next, means for securing these casings together and a tank for permitting the separation of the oil and water by gravity, substantially as described.

7. The combination of a pan, a pipe secured to the bottom of said pan and projecting at its end, slightly above this bottom, a series of casings fitting around said pipe, and provided with diaphragms the bottom of one casing fitting into the top of the one below, and the top casing fitting against the bottom of said pan, and removable means for securing said casings against each other and the bottom of said pan, a settling-tank surrounding said pipe, and casings, and means for withdrawing the oil and water separately therefrom substantially as described.

8. The combination of filtering devices, a settling-tank in which the oil and water separate through the difference of their specific gravities, two pipes entering said tank, one for withdrawing the water and one for withdrawing the oil, the outlet of the oil-pipe being higher than the outlet of the water-pipe, the latter pipe extending downward toward the bottom of the tank, and having a pipe extending from said water-pipe to a point above the outlet of the oil-pipe substantially as described.

WM. C. FAHY.

Witnesses:
MARK WILKS COLLET,
GEO. W. REED.